(12) United States Patent
DeForest

(10) Patent No.: US 10,181,181 B2
(45) Date of Patent: Jan. 15, 2019

(54) DENOISING WITH THREE DIMENSIONAL FOURIER TRANSFORM FOR THREE DIMENSIONAL IMAGES, INCLUDING IMAGE SEQUENCES

(71) Applicant: Southwest Research Institute, San Antonio, TX (US)

(72) Inventor: Craig E. DeForest, Nederland, CO (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 126 days.

(21) Appl. No.: 15/591,284

(22) Filed: May 10, 2017

(65) Prior Publication Data

US 2018/0330482 A1    Nov. 15, 2018

(51) Int. Cl.
    *G06T 5/10*    (2006.01)
    *G06T 7/11*    (2017.01)

(52) U.S. Cl.
    CPC ............... *G06T 5/10* (2013.01); *G06T 7/11* (2017.01); *G06T 2207/20021* (2013.01)

(58) Field of Classification Search
    CPC ... G06T 5/002; G06T 5/10; G06T 7/11; G06T 2207/20021; G06T 2207/20221; H04N 19/117; G06K 9/0051

USPC ............. 382/254, 260, 269, 275, 280
    See application file for complete search history.

(56) References Cited

U.S. PATENT DOCUMENTS

| | | | |
|---|---|---|---|
| 5,500,685 A * | 3/1996 | Kokaram | H04N 5/145 348/620 |
| 8,619,881 B2 | 12/2013 | Schoenbaum | |
| 9,326,008 B2 | 4/2016 | Kokarem | |
| 2014/0126806 A1* | 5/2014 | Eguchi | G06T 5/10 382/154 |
| 2017/0046557 A1* | 2/2017 | Laleg-Kirati | G06T 5/002 |
| 2017/0154413 A1* | 6/2017 | Yu | G06T 7/0036 |

* cited by examiner

*Primary Examiner* — Daniel G Mariam
(74) *Attorney, Agent, or Firm* — Livingston Law Firm

(57) ABSTRACT

A method of mitigating noise in source image data representing pixels of a 3-D image. The "3-D image" may be any type of 3-D image, regardless of whether the third dimension is spatial, temporal, or some other parameter. The 3-D image is divided into three-dimensional chunks of pixels. These chunks are apodized and a three-dimensional Fourier transform is performed on each chunk, thereby producing a three-dimensional spectrum of each chunk. The transformed chunks are processed to estimate a noise floor based on spectral values of the pixels within each chunk. A noise threshold is then determined, and the spectrum of each chunk is filtered with a denoising filter based on the noise threshold. The chunks are then inverse transformed, and recombined into a denoised 3-D image.

20 Claims, 3 Drawing Sheets

$$\text{Im}'_i(k_x, k_y, \omega) \equiv \text{Im}'_i(k_x, k_y, k_\omega) F'_i(k_x, k_y, k_z)$$

FIG. 4

$$F'_{i,gate}(k_x, k_y, \omega) \equiv \begin{Bmatrix} 0 \text{ if } \text{Im}'_i(k_x, k_y, \omega) < T_i(k_x, k_y, \omega) \\ 1 \qquad \text{otherwise} \end{Bmatrix}$$

FIG. 5

$$F'_{i,wiener}(k_x, k_y, \omega) \equiv \frac{\text{Im}'_i(k_x, k_y, \omega) / T_i(k_x, k_y, \omega)}{1 + \text{Im}'_i(k_x, k_y, \omega) / T_i(k_x, k_y, \omega)}$$

FIG. 6

$$T_i(k_x, k_y, \omega) \equiv \gamma N'_i(k_x, k_y, \omega)$$

FIG. 7

$$\text{Im}(x, y, t) = \text{Im}_0(x, y, t) + N_a(x, y, t) + N_s(x, y, t) + N_{other}(x, y, t)$$

FIG. 8

$$N_s(x, y, t) \approx \alpha G(x, y, t) \sqrt{\text{Im}_0(x, y, t)}$$

FIG. 9

$$N'_s(k_x, k_y, \omega) \approx \alpha G'(k_x, k_y, \omega) \otimes F(\sqrt{\text{Im}_0(x, y, t)})$$

FIG. 10

$$|N'_s(k_x, k_y, \omega)| \approx \beta(k_x, k_y, \omega) \sum_{x,y,t} \sqrt{\text{Im}(x, y, t)}$$

FIG. 11

$$\text{Im}'_i(k_x, k_y, \omega) \approx \text{Im}'_{0,i}(k_x, k_y, \omega) + \beta \sum_{x,y,t} \sqrt{\text{Im}_i(x, y, t)}$$

FIG. 12

$$\beta_i(k_x, k_y, \omega) \approx \frac{|\text{Im}'_i(k_x, k_y, \omega) - \text{Im}'_{0,i}(k_x, k_y, \omega)|}{\overline{\text{Im}_i}}$$

FIG. 13

$$\beta_{\text{approx}}(k_x, k_y, \omega) = \text{median}_i \left( \frac{|\text{Im}'_i(k_x, k_y, \omega)|}{\overline{\text{Im}_i}} \right)$$

FIG. 14

$$|N'_{i,a}(k_x, k_y, \omega)| = \text{median}_j (\text{Im}'_j(k_x, k_y, \omega))$$

FIG. 15

DENOISING WITH THREE DIMENSIONAL FOURIER TRANSFORM FOR THREE DIMENSIONAL IMAGES, INCLUDING IMAGE SEQUENCES

GOVERNMENT SUPPORT CLAUSE

This invention was made with United States Government Support under Prime Contract Nos. NNX16AF98G and NNX16AG98G, funded by NASA Goddard Space Flight Center. The Government has certain rights in this invention.

TECHNICAL FIELD OF THE INVENTION

This invention relates to image processing, and more particularly to a method of removing noise using adaptive filtering in the Fourier domain.

BACKGROUND OF THE INVENTION

Many scientific, medical, or other still images and image sequences are conveyed from an image sensor via a signal that contains additive noise that contaminates the signal. The noise takes the form of a random variable, typically approximately normally distributed, that is sampled independently at different locations in the image. These locations can vary in size from single pixels to resolution elements. The noise distribution can be independent of the image value ("pure additive noise") or dependent on the image value ("variable additive noise").

An example of pure additive noise is read noise of a digital image detector. Another example of pure additive noise is random electromagnetic interference in a digital image detector.

An example of variable additive noise is photon shot noise associated with the Poisson statistics of photon counting in modern detectors, which varies as the square root of total photon count. Another example is film grain, which affects conventional photographic images and movies in a complex, but predictable, manner that depends on the photographic process and the local image value.

Pure and variable additive noise can significantly limit both the dynamic range and resolution of an image. Some examples, without implied limitation, include: low-light photography and cinematography of all sorts; medical imaging including magnetic resonance imaging, X-ray imaging or fluoroscopy, and computed-tomography scans; and astrophotography and astrophysical imaging.

Various techniques exist to reduce noise both in still images and in image sequences. For image sequences, such as video, conventional denoising methods use Fourier transforms, and also use a motion estimation process that estimates the degree of motion in portions of the sequenced images. The motion estimation process co-aligns features that are present in adjacent frames of the sequence, and makes use of temporal redundancy. However, the motion estimation process is ill-posed and imposes known difficulties. It also limits the use of the noise reduction technique on tomographic data or other non-temporal data sets that may be represented as a sequence of images.

Conventional denoising methods for image sequences sometimes refer to "3-D denoising". However, this may mean 2-D transforms followed by 1-D transforms, and these methods include the above-described motion estimation. This approach is described in U.S. Pat. No. 8,619,881, and other references.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 4-15 illustrate mathematically, how the denoising process is implemented.

DETAILED DESCRIPTION OF THE INVENTION

Overview

The following description is directed to an image denoising method that finds the statistical signature of noise in the three-dimensional Fourier domain, in small localized "chunks" of 3-D images, as defined herein. The method makes use of coherence of image features across all three dimensions, to discriminate between a valid image signal and noise. The method does not require motion estimation between two-dimensional image frames.

In what is conventionally thought of as a "3-D image", the third dimension is spatial, e.g. an (x, y, z) image. For example, in a tomographic data set, the third dimension would represent the third spatial dimension.

However, for purposes of this description, the term "3-D image" is also used to include an image sequence or other ordered sets of images in which the third dimension is not necessarily spatial. An "image sequence" can be broadly defined as an ordered set of 2-D images, with sequence number being the third dimension. For example, an image sequence could represent a sequence of frames in a movie or video, with the third dimension being time, e.g. an (x, y, t) image.

Thus, for purposes of this description, 3-D images can be "spatial 3-D images" or "time 3-D images", or other types of "3-D images", in which the third dimension could be some other parametric dimension, such as a spectral dimension. For convenience, the term "image" is sometimes used herein, and it should be clear from context that "3-D image" as defined above is meant.

The "3-D image" may be semi-infinite along the third dimension, such as a data stream, or may have well defined boundaries known in advance, such as a finite length video or a well defined 3-D data set.

The 3-D image structure is exploited without reference to specific features or to bulk motion of the image subject through the image plane. As compared to the 2-D transform processing referred to in the Background, for time 3-D images, additional noise reduction for the 3-D transform processing described herein arises because the method exploits feature coherence across both time and space. The method requires only that a moving or evolving object have a discrete Fourier spectrum that is distinguishable in amplitude from the background noise field, without regard for the shape of the feature or the particulars of its evolution across image frames.

3-D Denoising System and Method

Figure 1:
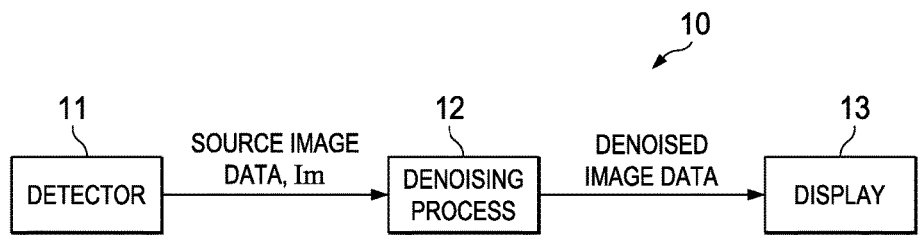
FIG. 1 illustrates an imaging system with a denoising process in accordance with the invention.

FIG. 1 illustrates one embodiment of the invention for the tangible result of displaying a denoised image. Other embodiments are discussed below.

System 10 is an imaging display system, with a denoising process 12 in accordance with the invention. It should be understood that, although not shown, various other processes may be performed on the image data; only the processing relevant to the invention is shown.

The detector 11 may be any type of image gathering device. The image data, Im, is three-dimensional. The 3-D images comprise, in two of the three dimensions, a 2-D "image frame" of pixels, each pixel having a vertical position, a horizontal position, and one or more pixel data values. In a monochromatic image, each pixel has a brightness value. A color image might have three values (red, green, and blue brightnesses) at each pixel location. Similarly, a hyperspectral image might have multiple pixel values. Multiple pixel values might be treated independently by the method described herein, or be combined through a mathematical transformation before being treated. As discussed above, the third pixel dimension can be time, space, or some other parameter.

The denoising process 12, explained in detail herein, mitigates noise within the 3-D image. It is a computer-implemented process, and process 12 includes processing hardware and software appropriate to implement the method described herein. Process 12 may be integrated with a more comprehensive image processing system for various other image processing and buffering steps.

The denoising process 12 receives noisy 3-D image data, performs the denoising process, and outputs denoised 3-D image data. In the embodiment of FIG. 1, the data is then delivered to a display 13, which may be any device that generates a tangible output, such as a monitor or printer. This output is data representing a denoised 3-D image, that is, the original image data has had its noise components reduced.

In other embodiments, the denoised data may be delivered to some other output device or to a process for further processing. Denoising of 3-D images can help prepare the 3-D image data for many types of further processing. In addition to direct display, the image data can be input to data compression processing and stored or transmitted for later display. Examples of other applications are for optical flow measurement, tomographic reconstruction analysis, photometric or colorimetric analysis, timing analysis, and further feature enhancement via processes such as unsharp masking. In general, the eventual tangible result of the 3-D image denoising process can be for direct visual graphic display or any other quantitative analysis.

Figure 2:
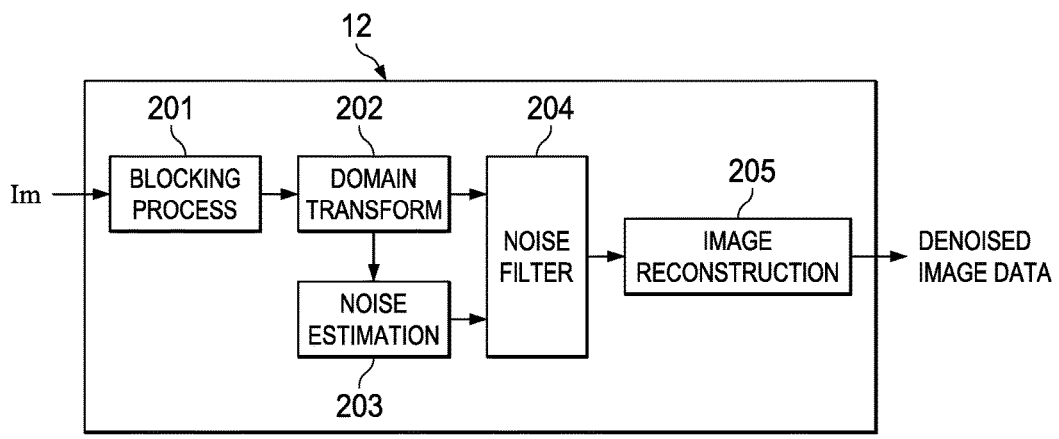
FIG. 2 illustrates the various subprocesses of the denoising process.

FIG. 2 illustrates the 3-D image denoising process 12 in further detail.

In a blocking process 201, the 3-D image is broken into 3-D overlapping "chunks" of size n1×n2×n3. As described above, for time 3-D images, the third dimension is time. In other words, each pixel of the image sequence is considered to have the two dimensions of a 2-D image and additionally a third dimension, which refers to position in time. For other 3-D images, the third dimension could be a spatial dimension. Or, the third dimension could be some other parameter dimension differentiating images in a data set of related image frames.

The chunks need not necessarily be the same size in all three dimensions. In other words, in some implementations, n1, and n2 and n3 may be equal. However, no numerical relation between this size of these chunk dimensions is necessary.

The chunks are "aligned" in all dimensions. Each chunk is taken from the same horizontal and vertical (x, y) position in the frames. For spatial 3-D (x, y, z) images, the chunks have the "z" positions corresponding to that (x, y) position in successive frames. For time 3-D images (x, y, t), the chunks have the "t" sequence corresponding to that (x, y) position in successive frames.

An example of blocking process 201 is subsampling a 3-D image data set into 12×12×12 (cubical) pixel chunks, staggered every three pixels. The size of the chunks for a particular application may be varied to take advantage of the particular spectral characteristics of an image.

Figure 3:
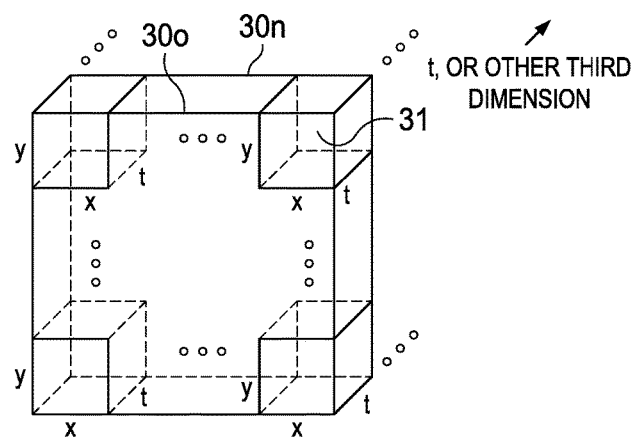
FIG. 3 illustrates the "chunking" process for an image sequence, in which time is treated as a third dimension.

FIG. 3 illustrates the chunking process 201 for a 3-D image comprising n frames 30. For time 3-D images, the 3-D (x, y, t) chunks 31 are taken from successive image frames of an image sequence. In the example of FIG. 3, the chunks are cubical, such that each chunk 31 is n×n×n pixels. Using the 12×12×12 example, the time dimension of each chunk would call for including pixels from 12 successive image frames. Although not explicitly shown in FIG. 3, neighboring chunks are overlapping to enable apodization of each chunk.

The overall concept of using "chunks" is that of local neighborhood noise filtering. Features in an image tend to have a concentrated Fourier spectrum. In each chunk of pixels containing noisy but discernable structure (features), typically only a few Fourier components will contain nearly all the Fourier energy in a feature. This is in contrast to uncorrelated per-pixel noise, which in not concentrated by the Fourier transform. As a result, features become more concentrated in the Fourier domain, compared to noise. This concentration can be used to retain features, while attenuating or rejecting components containing mainly noise. The denoising is locally adapted to preserve the data signal in each neighborhood of the 3-D image.

Also, in the blocking process 201, the chunks are individually apodized. Apodization brings the edges of each image chunk smoothly to zero in a way that minimizes edge effects on the Fourier spectrum. It is accomplished by multiplying each image chunk by a windowing function, which convolves the Fourier spectrum.

For example, each chunk may be multiplied by the Hanning (sin ^2) window function. The Hanning window has Fourier power only in the zero and first nonzero frequency in each axis, and therefore minimally spreads the spectrum of the apodized image. In practice, apodization may be applied both before and after filtering.

In the transform process 202, each chunk is Fourier-transformed using the real-number FFT (or, equivalently, discrete cosine transformed) to produce a 3-D image spectrum. This 3-D image spectrum is the combined spectrum of any local image elements, together with image noise.

Adaptations can be made depending on the application. For example, rather than the full complex discrete Fourier transform, it may be sufficient to use the real discrete Fourier transform or, equivalently, the discrete cosine transform. All such transforms are deemed equivalent for purposes of this description.

The noise estimation process 203 is essentially estimation of a noise "floor" to be used in a denoising filter. As explained below, having determined a noise floor, a noise threshold and a denoising filter can be derived.

In one approach, described in detail below, the noise floor is determined a posteriori from local image characteristics inside each chunk. A "constant-across-images spectrum" derived from ensemble statistics of the transformed chunk spectra can be used as one factor of noise estimation.

Parametric functions that describe how the noise is thought to vary across image brightness values can also be used for noise estimation, and determined either a priori or a posteriori. For example, in some types of 3-D images, shot noise varies as the square root of brightness. Other detector noise sources, such as electromagnetic interference or film grain, may vary as some other function of the image brightness. Similarly, noise sources may depend on location within the image. For example, shot noise may vary in a known way across the image as a result of optical vignetting or other detection effect.

Alternatively, a noise floor may be determined by some other means. As an example, the noise floor may be a constant value for simple noise gating.

In the noise filter process 204, the spectrum of each separate chunk is modified according to a denoising filter function.

FIG. 4 illustrates the adaptive filter concept—a collection of filter functions, $F'_i$, that are applied to corresponding image chunks, $Im_i$, or their Fourier transformed counterparts, $Im'_i$. The index notation "i" distinguishes between different filter functions, each of which may be calculated from the determined noise spectrum and the corresponding image chunk.

For example, as illustrated in FIG. 5, a simple noise gating filter may zero those components that do not rise above an identified noise floor. The threshold function, $T_i$, is based on noise floor levels.

Alternatively, as illustrated in FIG. 6, a Wiener filter may be used to scale each component according to its amplitude relative to the computed floor value for that component in that particular chunk. The Wiener filter tends to roll off filter response more gradually, but may admit more noise at a given threshold level.

In simple denoising functions, the threshold level, T, may be equal to the noise floor, N, which itself may be fixed or parametrically adjusted as described below. Or, T may be calculated as an ad hoc factor, $\gamma_i$ times a noise floor, N, that is either fixed or parametrically adjusted. The ad hoc factor, $\gamma_i$ biases the filtering between preserving the most signal possible or rejecting the most noise possible.

FIG. 7 illustrated the threshold function, T, as a function of both an ad hoc factor and a parametrically adjusted noise spectrum, $N'(k_x, k_y, \omega)$. A detailed discussion of this noise model is set out below.

In the image reconstruction process 205, the chunks are recombined into a facsimile of the original image data, via inverse-transformation and weighted summing. If the windowing function is the Hanning function, the original 3-D image may be recreated by overlapping chunks in such a way that their window functions sum to unity, avoiding the need to accumulate a weighted sum.

For an image stream, the process is repeated for successive image frames. Overlapping chunks of pixels are repeatedly generated and processed as described above. Because the denoising method is a local process, once a noise floor or other denoising function is determined, the method may be used as a stream or pipeline process, acting on a semi-infinite 3-D image as individual 2-D image plane frames. In other words, for long image sequences, the chunking, transforming, filtering, and reconstructing process may be repeated in the time dimension, until a desired length of the image sequence is denoised.

Several approaches are possible to overcome any edge effects induced in the apodization or windowing functions by the transform-domain filtering. A first approach is to oversample the data with multiple overlapping chunks containing each individual data point. A second approach is to hybridize the windowing function with a second regularization step of apodization after the filtering step.

A feature of the method is that it does not rely on motion compensation, nor on the existence of a nearly unchanging feature with a well-defined motion vector. Thus, the method is suitable not only for video and other image sequences, but for 3-D image data sets such as tomographic images.

The above-described method exploits the well-known property of the Fourier transform that structured objects such as image features are localized (concentrated) in Fourier space, while random variables such as noise are not. This permits, under many circumstances, clean separation of image features from noise. By preserving image Fourier components that rise above a predetermined or calculated noise floor, and rejecting or attenuating those that do not, the method rejects noise while retaining important image data.

The resulting preserved features are photometrically accurate in the sense that the method preserves all feature information that can be discerned above the noise level. This results in images that have significantly less noise but retain the full spatial and, where relevant, temporal resolution of the original unprocessed image data. By comparison, conventional de-noising methods, such as blurring or temporal averaging, often trade resolution for dynamic range by attenuating all components in the high spatial and temporal frequency portion of Fourier space, whether or not those components contain significant amounts of information above the noise floor.

The above-above described method may be compared in effectiveness to simple blurring by averaging the value in regions equivalent to the "chunks" of the above method. If a chunk contains N pixels, and the noise is sampled independently in each pixel, then blurring by averaging all pixels in a chunk will typically reduce the noise signal by factor of sqrt(N). Applying the above method to the same region may only reject approximately half of the Fourier terms, resulting in approximately 70% of the noise reduction that simple blurring would produce, while still preserving full resolution image structure.

Processing image sequences as 3-D chunks offers major gains in noise reduction compared to processing each image independently. This is because 3-D chunks with length scale of L pixels typically reduce the noise by L raised to the 3/2 power. In contrast, 2-D chunks with length scale L pixels reduce it only by L raised to the 1st power.

The method relies only on the existence of coherent structure that persists between image planes, without regard to the nature of that structure. For example, features that distort, fade, move, or rotate between image planes will produce a coherent set of enhanced coefficients in the corresponding Fourier-transformed chunks, even though the particular coefficients that are enhanced vary with the feature's behavior. This permits the method to differentiate between coherent signal and incoherent noise, even though neither the feature nor its evolution are specifically identified.

The above method fits into the broad category of "adaptive filtering", with filters that change their characteristics across an image according to statistics of the image itself. It is reminiscent of methods used in JPEG compression, with important distinctions. First, JPEG compression is intended to compress the data, not to improve it, and therefore attenuates or degrades the representation of Fourier components that are deemed nonessential, rather than attenuating or eliminating components that are deemed to be noise. Second, JPEG compression does not operate on apodized, re-merged windows but rather on isolated chunks without apodization. Third, JPEG compression operates on 2-D images.

Estimating Noise Level from Noise Spectrum

As illustrated in FIG. 8, 3-D images are mappings Im: $Z^3 \to R$, where the domain runs over pixel coordinates and the range describes image brightness. In general, practical image sequence data (after correction for fixed detector effects, i.e. "flat-fielding") contain at least additive and shot noise. In the example of FIG. 8, Im is a time 3-D image, $Im_0$ is the "ideal" noise-free dataset, $N_a$ is an additive "background noise" term independent of $Im_0$, $N_s$ is an additive "shot noise" term that depends on $Im_0$, and $N_{other}$ is noise from all other sources.

Simple threshold noise-gate filtering, based on a simple threshold of component amplitude, to remove $N_a$ can be adapted to 3-D images, by chunking and Fourier transforming in three dimensions as described above. However, this simpler method is not readily applicable to many image applications, because uniform additive noise is often not the dominant contaminant of image data. In a large class of images, $N_s$ rather than $N_a$, dominates the noise field in the image; $N_a$ and $N_{other}$ can be neglected. Because $N_s$ depends on the value of $Im_0$, the simple form of noise-gate filtering is not sufficient as it is for $N_a$.

Shot noise arises from the Poisson-distribution statistics of counting discrete quanta—photons, photoelectrons, or other quantized elements that depend on the detection technology. Shot noise is a random variable, sampled once per pixel, whose value depends also on the local value of the source image.

FIG. 9 represents an estimate of shot noise, when the number of quanta is high and the Poisson distribution is well approximated by a Gaussian distribution. The constant $\alpha$ is an instrument-dependent constant, and $G(x, y, t)$ is a random variable with a fixed Gaussian distribution of mean 0 and variance 1.

The equation of FIG. 9 is particularly useful because it divides shot noise into three components, two of which can be well characterized. The $\alpha$ coefficient is a constant of the instrument, and can be reconstructed from flat-field images or directly from image data. The function $G(x, y, t)$ is a standard tool of statistical analysis.

FIG. 10 illustrates how, by Fourier transforming the equation of FIG. 9, it is possible to estimate the spectral amplitude of the noise in the image.

But $G'(k_x, k_y, \omega)$ is constant across Fourier space, since $G(x, y, t)$ is a normal random variable. For a broad class of scenes, the zero-frequency component of the Fourier transform dominates the spectrum and the F (square root) term can be treated as a delta function.

From the foregoing, the approximation of FIG. 11 is possible. The constant $\beta$ (referred to herein as a "constant-across-images spectrum") is a constant-across-images spectrum that is characteristic of the detector that acquired the image. The fact that the sum of the noise term over many pixels is approximately zero, is used to replace $Im_0$ with Im under the radical.

The equation of FIG. 11 is useful because it estimates the noise amplitude in an image, if $\beta$ can be determined. In principle, $\beta$ can be determined a priori from the absolute sensitivity of the detector. However, $\beta$ can also be determined by a posteriori analysis of the data. This is accomplished by breaking a full dataset Im(x, y, t) into multiple chunks $Im_i$, and searching for a minimum scaled spectrum for each one.

FIG. 12 illustrates the result of Fourier transforming the equation of FIG. 8 with $N_a$ and $N_{other}$ neglected, and substituting the equation of FIG. 11, for each chunk index i.

Solving for $\beta$ gives the equation of FIG. 13. The difference in the numerator is the (unknown) Fourier spectrum of the shot noise, and the bar over $Im_i$ in the denominator indicates summing the square root of each (positive-definite) pixel value.

Across a large population of image chunks, the estimates of $\beta i$ at a given location in Fourier space will vary from a minimum where the noise spectrum sample at that particular point is near zero, to a maximum where the local sampled value of the shot noise is much larger than the corresponding Fourier component $Im'_0$. But structured images containing coherent features are dominated by a few sparse Fourier components where $Im'_0(k_x, k_y, \omega) \approx Im'(k_g, k_y, \omega)$. Because the shot noise is a random variable, its Fourier amplitude is more nearly constant throughout the space, and most Fourier components are instead dominated by the noise: $|Im'_0| \ll |Im'(k_x, k_y, \omega)|$. Because the latter is the more common case, the median value of $\beta_i$ across many image samples is a good estimator of the noise spectrum.

From the foregoing, $\beta$ can be approximated as shown in FIG. 14. This approximation depends only on the statistics across image chunks of the Fourier spectrum in the original data set.

The calculated value of $\beta_{approx}$ allows estimation of the noise level across all regions of an image sequence dominated by conventional shot noise, per the equation of FIG. 11. Referring to both FIGS. 7 and 11, the approximation of $\beta$ provides a basis for the threshold functions, $T_i$, in the denoising filters described above.

The approximation of $\beta_i$ in FIG. 14 requires that a significant fraction of the Fourier space be noise dominated, e.g., at least half of all chunks. This is typically the case in image sequences that have direct visual evidence of shot noise. However, for images that are more highly structured, the median could be replaced with a lower percentile value.

The above-described noise estimation process avoids a need to detect scene changes (motion estimation) as do some conventional denoising techniques. The noise performance of the detector is parameterized. As a result, multiple image frames taken with the same exposure and optical settings of the detector, will have the same parametric noise performance. The above-described $\beta$ parameter is a constant of the detector.

As stated in the Background, shot noise is dependent on the value of the image, and is distinguishable from pure additive noise, which is independent of the image value.

FIG. 15 illustrates how, for image-independent additive noise, one can estimate the noise level with a simpler calculation of a constant level across image chunks. As with the equation of FIG. 14, for images in which noise is low or that are highly structured, the median can be replaced with a lower percentile across image samples.

The noise models of FIGS. 14 and 15 are two examples, for shot noise and for constant additive noise, respectively, of how noise models can be derived from the spectral values of the pixel within image chunks. In both methods, the noise level is an approximation that is derived from statistics across image chunks of the Fourier spectrum in the original data set.

The same concepts can be used to derive noise estimations for different kinds of noise. As another example, the noise estimator could comprise both shot noise and constant additive noise. Or, the noise estimator could represent multiplicative noise that acts like additive noise but varies linearly (or in some other mathematical function) with the image signal. Or, the noise estimator could make use of known variation in the image generation process, such as optical vignetting, to parametrically modify the noise estimate based on location within the 3-D image.

A possible application of the invention is to improve picture quality for still photographs. For this application, an imaging device collects a number of short exposures, such as 8-12 exposures. This image sequence is then processed with the above denoising method to denoise the sequence of exposures. After the denoising, a single still frame, such as from the middle of the sequence is reported as a still image. This method yields most of the benefit of a longer exposure, without the motion blur that the longer exposure would incur.

What is claimed is:

1. A method of mitigating noise in source image data representing pixels of a 3-D image, comprising:
   dividing the 3-D image into three-dimensional chunks of pixels;
   wherein each chunk is aligned from the same horizontal and vertical pixel positions of successive image frames;
   apodizing each chunk;
   performing a three-dimensional Fourier transform on each chunk, thereby producing transformed values of the pixels within each chunk and a three-dimensional spectrum of each transformed chunk;
   processing one or more transformed chunks to estimate a noise floor based on spectral values of the pixels within each chunk;
   determining a noise threshold based on the noise floor;
   filtering the spectrum of each transformed chunk with a denoising filter based on the noise threshold;
   inverse transforming the transformed chunks; and
   recombining the inverse transformed chunks into a denoised 3-D image.

2. The method of claim 1, wherein the three dimensions are vertical, horizontal, and time dimensions of image frames.

3. The method of claim 1, wherein the three dimensions are vertical, horizontal, and spatial.

4. The method of claim 1, wherein the three dimensions are vertical, horizontal, and spectral.

5. The method of claim 1, wherein each chunk has equal numbers of pixels in two or more dimensions.

6. The method of claim 1, wherein the denoising filter is a noise gating filter.

7. The method of claim 1, wherein the denoising filter is a Weiner filter.

8. The method of claim 1, wherein the method is performed in near real time as the 3-D image is received from an image data source over time.

9. The method of claim 1, wherein the noise floor is further based on statistics across image chunks of the Fourier spectrum in the source image data.

10. The method of claim 1, wherein the noise comprises shot noise, whose amplitude varies proportionally to the square root of the local image value.

11. The method of claim 10, wherein the noise floor is determined as a multiple of the median or some other percentile value of each spectral component amplitude, when that component is considered as a statistical ensemble across a number of chunks.

12. The method of claim 1, wherein the noise comprises additive noise independent of pixel values.

13. The method of claim 1, wherein the noise floor is determined as a multiple of the median or some other percentile value of each spectral component amplitude, when that component is considered as a statistical ensemble across a number of chunks.

14. A method of mitigating noise in source image data representing pixels of a 3-D image that comprises time-sequenced 2-D images, comprising:
   dividing the 3-D image into three-dimensional chunks of pixels, wherein the three dimensions are vertical, horizontal, and time dimensions;
   wherein each chunk is aligned from the same horizontal and vertical pixel positions of successive image frames;
   apodizing each chunk;
   performing a three-dimensional Fourier transform on each chunk, thereby producing transformed values of the pixels within each chunk and a three-dimensional spectrum of each chunk;
   determining a noise threshold;
   filtering the spectrum of each chunk with a denoising filter based on the noise threshold;
   inverse transforming the chunks; and
   recombining the chunks into a denoised image sequence.

15. The method of claim 14, wherein the noise threshold is determined a priori.

16. The method of claim 14, wherein the noise threshold is determined a posteriori from spectral values of the pixels within each chunk.

17. The method of claim 16, wherein the noise threshold is further based on statistics across image chunks of the Fourier spectrum in the source image data.

18. The method of claim 14, wherein the denoising filter is a noise gating filter.

19. The method of claim 14, wherein the denoising filter is a Weiner filter.

20. The method of claim 14, wherein the method is performed in near real time as the 3-D image is received from an image data source over time.

* * * * *